(12) United States Patent
Uemura (10) Patent No.: US 9,168,657 B2
(45) Date of Patent: Oct. 27, 2015

(54) PARALLEL LINK ROBOT WITH ADDITIONAL ACTUATOR ARRANGED AT DRIVEN LINKS

(71) Applicant: FANUC CORPORATION, Minamitsuru-gun, Yamanashi (JP)

(72) Inventor: Tokitaka Uemura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/015,772

(22) Filed: Aug. 30, 2013

(65) Prior Publication Data

US 2014/0060234 A1 Mar. 6, 2014

Related U.S. Application Data

(60) Provisional application No. 61/697,898, filed on Sep. 7, 2012.

(30) Foreign Application Priority Data

Sep. 3, 2012 (JP) ................... 2012-193428

(51) Int. Cl.
*B25J 11/00* (2006.01)
*B25J 9/00* (2006.01)

(52) U.S. Cl.
CPC ............... *B25J 11/00* (2013.01); *B25J 9/0051* (2013.01); *Y10T 74/20329* (2015.01)

(58) Field of Classification Search
CPC ................ B25J 9/0051; B25J 17/0266
USPC .......... 74/490.01, 490.03, 490.05; 901/19, 36
See application file for complete search history.

(56) References Cited

U.S. PATENT DOCUMENTS 3,862,769 A * 1/1975 Bechman et al. ............. 280/400
2011/0097184 A1 4/2011 Kinoshita et al.

FOREIGN PATENT DOCUMENTS

| CN | 101708611 A | 5/2010 |
|---|---|---|
| CN | 102049776 A | 5/2011 |
| DE | 102008019725 A1 | 10/2009 |
| JP | 9-136286 A | 5/1997 |
| JP | 2003-175485 A | 6/2003 |
| JP | 2007-512968 A | 5/2007 |
| JP | 4653848 B1 | 3/2011 |
| JP | 2011-088262 A | 5/2011 |
| WO | 87/03528 A1 | 6/1987 |

OTHER PUBLICATIONS

Office Action mailed Dec. 3, 2014, corresponding to Chinese patent application No. 201310392557.X.

* cited by examiner

*Primary Examiner* — William C Joyce
(74) *Attorney, Agent, or Firm* — Hauptman Ham, LLP (57) ABSTRACT

A parallel link robot (10) includes an additional actuator (13*d*) which is arranged between two driven links (22*b*, 23*b*) in parallel with these driven links, a power transmission shaft part (39) which extends coaxially from the additional actuator and transfers the rotational drive force of the additional actuator to a posture changing mechanism part (15), a universal joint (38) which links the shaft part (14) which extends from the posture changing mechanism part and a power transmission shaft part, and a linking/reinforcing part (61) which bypasses the universal joint and links together and reinforces the two ends of the cutaway part of the casing of the moving part (12).

5 Claims, 9 Drawing Sheets

PARALLEL LINK ROBOT WITH ADDITIONAL ACTUATOR ARRANGED AT DRIVEN LINKS

RELATED APPLICATIONS

The present application is based on, and claims priority from, Japanese Application Number 2012-193428, filed Sep. 3, 2012, and U.S. Provisional Application No. 61/697,898, filed Sep. 7, 2012 the disclosure of which is hereby incorporated by reference herein in its entirety.

BACKGROUND OF INVENTION

1. Field of Invention

The present invention relates to a parallel link robot which uses a δ-type parallel link mechanism which positions an end effecter three-dimensionally. In particular, the present invention relates to a parallel link robot with an additional actuator arranged between a pair of driven links.

2. Description of Related Art

Figure 10:
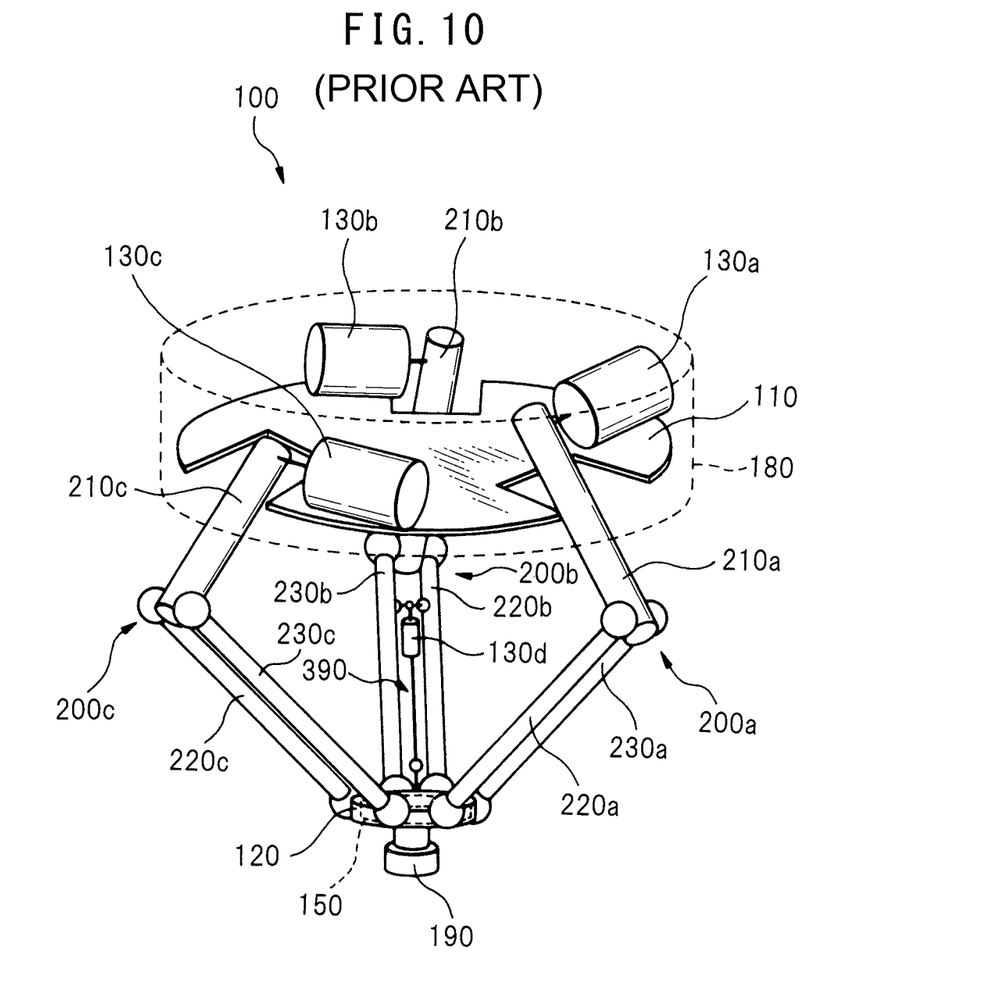
FIG. 10 is a perspective view of a parallel link robot in the prior art.

FIG. 10 is a perspective view of a parallel link robot in the prior art which is shown in Japanese Patent Publication No. 2011-88262A. In FIG. 10, a parallel link robot 100 mainly includes a base part 110 which is contained in a housing 180, a moving part 120, and three link parts 200a to 200c which link the base part 110 and the moving part 120. At the bottom surface of the moving part 120, a mounting member 190 is provided. A not shown end effecter is attached to the mounting member 190.

Figure 11:
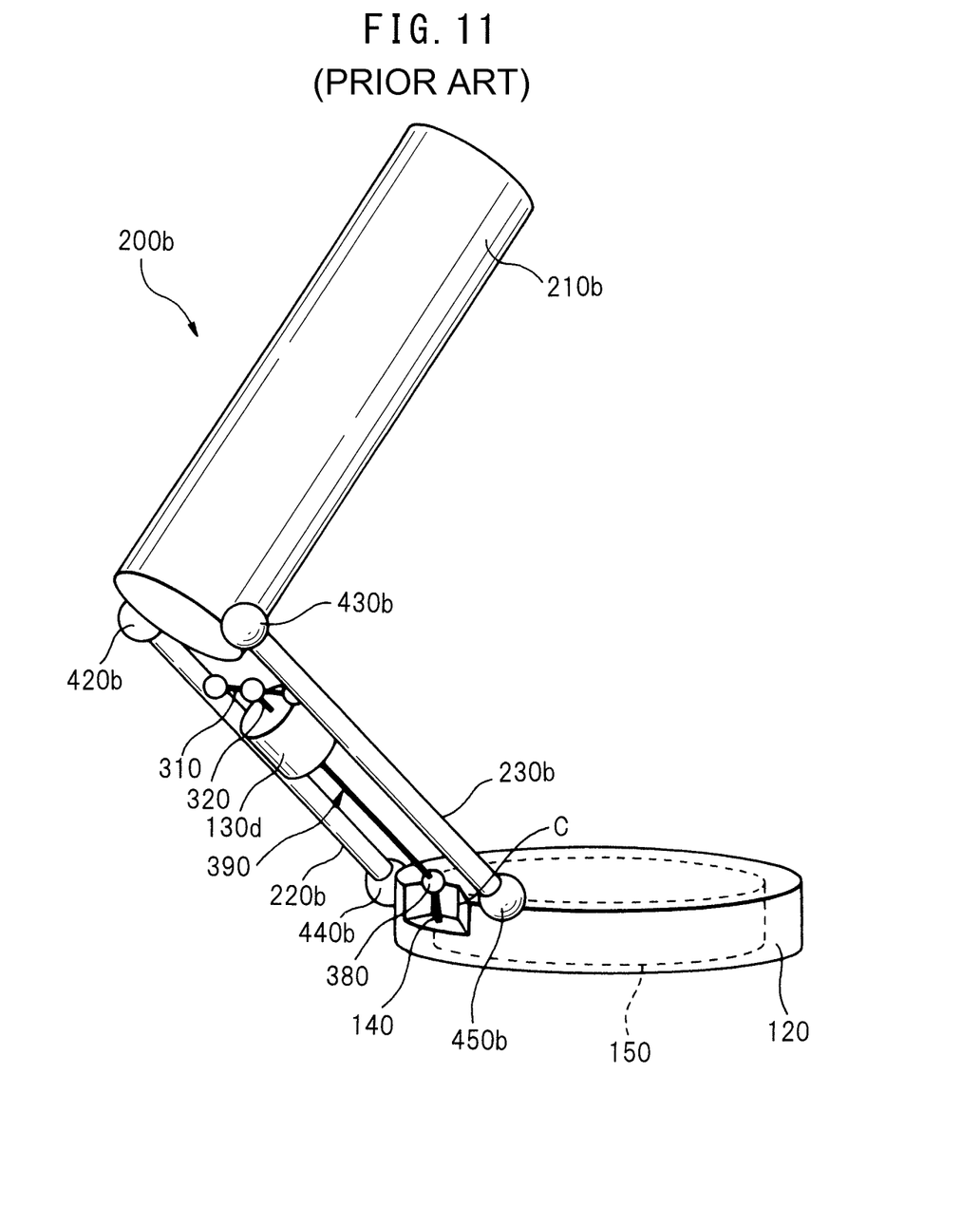
FIG. 11 is a partial perspective view of a parallel link robot which is shown in FIG. 10.

FIG. 11 is a partial perspective view of a parallel link robot which is shown in FIG. 10. As shown in FIG. 11, a link part 200b is comprised of a drive link 210b and two driven links 220b and 230b which extend from the moving part 120. These are linked together by spherical bearings 420b and 430b. Further, the front ends of the driven links 220b and 230b are linked by spherical bearings 440b and 450b to the moving part 120. These spherical bearings 420b to 450b are arranged so that the quadrilateral shape having these spherical bearings as vertexes becomes a parallelogram. In FIG. 10, the drive link 210b which extends from the base part 110 is connected to an actuator 130b which drives the drive link 210b. This actuator 130b is placed on the base part 110.

Referring to FIG. 11, a reinforcing link 310 links the two driven links 220b and 230b with each other through bearings. Furthermore, an additional actuator 130d is attached to a shaft 320 which extends from the center part of the reinforcing link 310 through a bearing. As shown in the figure, an output shaft of the additional actuator 130d is directed toward the moving part 120.

As shown in FIG. 11, a power transmission shaft part 390 which extends from the output shaft of the additional actuator 130d extends between the two driven links 220b and 230b in parallel with these driven links 220b and 230b. Furthermore, the power transmission shaft part 390 is connected to a shaft part 140 which extends from a posture changing mechanism part 150 through a universal joint 380. The posture changing mechanism part 150 performs the function of changing the posture of the mounting member 190. Due to this, the posture of the end effecter can be changed.

In this connection, the universal joint 380 has to be arranged on the line connecting the two spherical bearings 440b and 450b. In other words, the universal joint 380 and two spherical bearings 440b and 450b are positioned on the same line. To arrange the universal joint 380 as explained above, as shown in FIG. 11, a cutaway part C has to be formed in the edge of the moving part 120.

In general, to increase the reciprocating operations per unit time, the parallel link robot is required to operate at a high speed. To realize this, the driven links and moving part can be lightened in weight as much as possible. In this regard, when cutaway part C is formed, to secure the necessary rigidity, it is required that the moving part 120 be a certain degree of thickness. For this reason, there have been limits to the lightening of the moving part 120.

Figure 12:
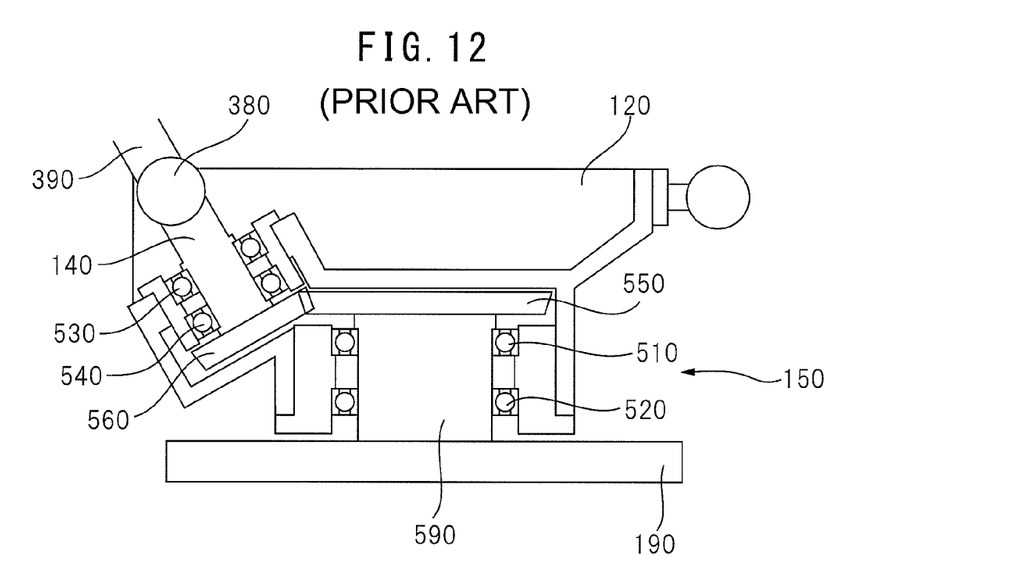
FIG. 12 is a cross-sectional view of a moving part in the prior art.

Furthermore, FIG. 12 is a cross-sectional view of a moving part in the prior art. In FIG. 12, a mounting member 190 which can rotate around a rotary shaft 590 is attached below the moving part 120. At the rotary shaft 590, a first bearing 510 and a second bearing 520 are arranged. At a front end of the rotary shaft 590, a bevel gear 550 is attached. As can be seen from FIG. 12, the bevel gear 550 of the rotary shaft 590 is engaged with a bevel gear 560 which is attached to a front end of a shaft part 140. Further, at the shaft part 140, a third bearing 530 and a fourth bearing 540 are arranged. These bevel gears 550 and 560 form a posture changing mechanism part 150.

In this connection, the modules and shapes of the bevel gears 550 and 560 are determined in accordance with the speed ratios and transmitted power of the bevel gears 550 and 560. Further, if the bevel gears 550 and 560 are determined in shape, the positional relationship between these bevel gears 550 and 560 and the universal joint 380 is determined. For this reason, the positional relationship between the top surface of the moving part 120 and the bevel gears 550 and 560 cannot be changed.

Therefore, as shown in FIG. 12, when the first bearing 510 and the second bearing 520 are arranged between the mounting member 190 and the bevel gear 550, a certain degree of space is required between the mounting member 190 and the bevel gear 550. For this reason, the casing of the moving part 120 becomes long in the axial direction of the rotary shaft 590 and the moving part 120 as a result becomes larger in size and increases in weight as well.

Figure 13:
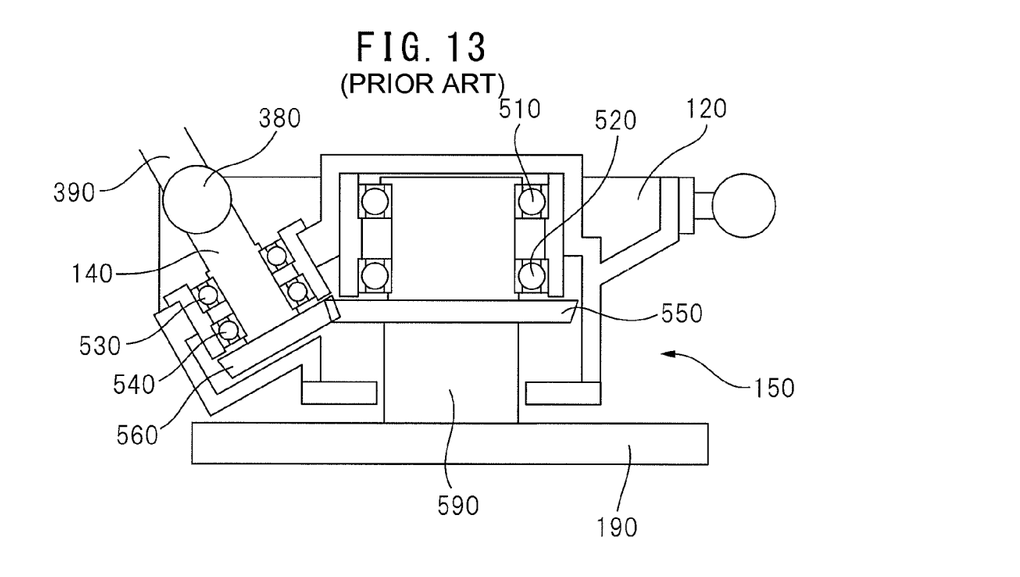
FIG. 13 is a cross-sectional view of another moving part in the prior art.

Further, FIG. 13 is a cross-sectional view of a moving part in another prior art. In FIG. 13, a first bearing 510 and a second bearing 520 are arranged further from a bevel gear 550 when viewed from the mounting member 190. In this case, to make the load which is applied to the first bearing 510 and the second bearing 520 smaller, the distance between the first bearing 510 and the second bearing 520 has to be made longer. Alternatively, to enable the applied load to be withstood, the first bearing 510 and the second bearing 520 themselves have to be made larger. For this reason, the casing of the moving part 120 also would become larger in size and the weights of the moving part 120 and its related members would also increase.

Furthermore, a parallel link robot is sometimes used in the fields of food, pharmaceuticals, cosmetics, etc. In such a case, due to issues with sanitation, it is necessary to prevent fluid from building up when cleaning the parallel link robot.

The present invention was made in consideration of this situation and has as its object the provision of a parallel link robot which maintains a high rigidity while being provided with a light weight moving part.

SUMMARY OF INVENTION

To achieve the above object, according to a first aspect, there is provided a parallel link robot comprising a base part, a moving part, three link parts which link the base part and the moving part and respectively have single degrees of freedom with respect to the base part, three actuators which drive the link parts, respectively, each of the link parts being comprised of a drive link which is linked with the base part and two parallel driven links which link the drive link and the moving part, a posture changing mechanism part which changes the posture of an element which is attached to the moving part, an additional actuator which is arranged between the two drive links of at least one the link part in parallel to these driven links, a power transmission shaft part which extends coaxially from the additional actuator and transmits the rotational drive force of the additional actuator to the posture changing mechanism part, and a universal joint which connects a shaft part which extends from the posture changing mechanism part and the power transmission shaft part, the universal joint being arranged in a cutaway part which is formed in a casing of the moving part and being positioned on a line connecting two intersecting points between the two driven links and the moving part, wherein the parallel link robot comprises a linking/reinforcing part which bypasses the universal joint and links and reinforces the two ends of the cutaway part of the casing of the moving part.

According to a second aspect, there is provided the first aspect wherein the posture changing mechanism part includes a first bevel gear which is attached to a rotary shaft which turns an element which is attached to the moving part and a second bevel gear which is attached to the shaft part and engages with the first bevel gear, wherein a first bearing is arranged at the rotary shaft at one side of the first bevel gear, and a second bearing is arranged at the rotary shaft at the other side of the first bevel gear.

According to a third aspect, there is provided the first aspect wherein the moving part is formed with at least one groove or through hole at its casing.

These objects, features, and advantages of the present invention and other objects, features, and advantages will become further clearer from the detailed description of typical embodiments of the present invention which are shown in the attached drawings.

DETAILED DESCRIPTION

Below, the attached figures will be referred to so as to explain the embodiments of the present invention. In the following figures, similar members are assigned similar reference signs. To facilitate understanding, these figures are suitably changed in scale.

Figure 1:
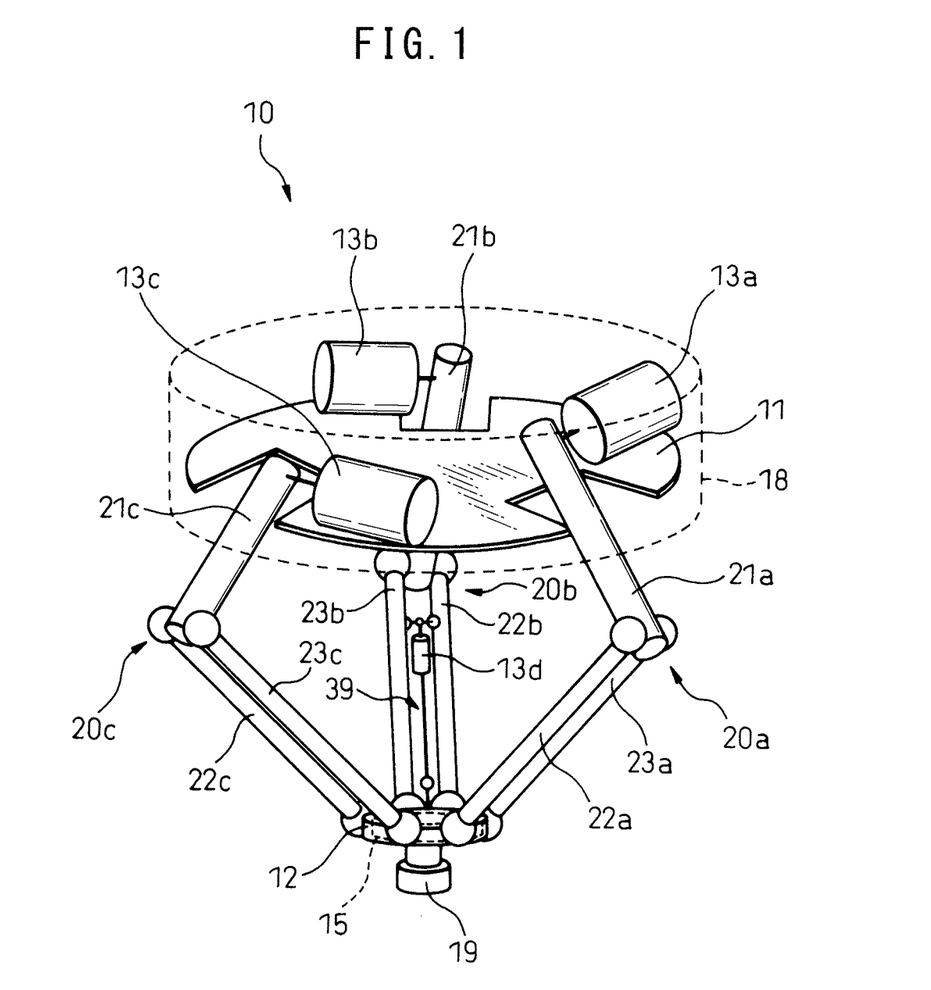
FIG. 1 is a perspective view of a parallel link robot according to the present invention.

FIG. 1 is a perspective view of a parallel link robot according to the present invention. In FIG. 1, a parallel link robot 10 mainly includes a base part 11 which is contained in a housing 18, a moving part 12, and three link parts 20a to 20c which link the base part 11 and moving part 12. At the bottom surface of the moving part 12, a mounting member 19 is provided. A not shown end effecter is attached to the mounting member 19.

Figure 2:
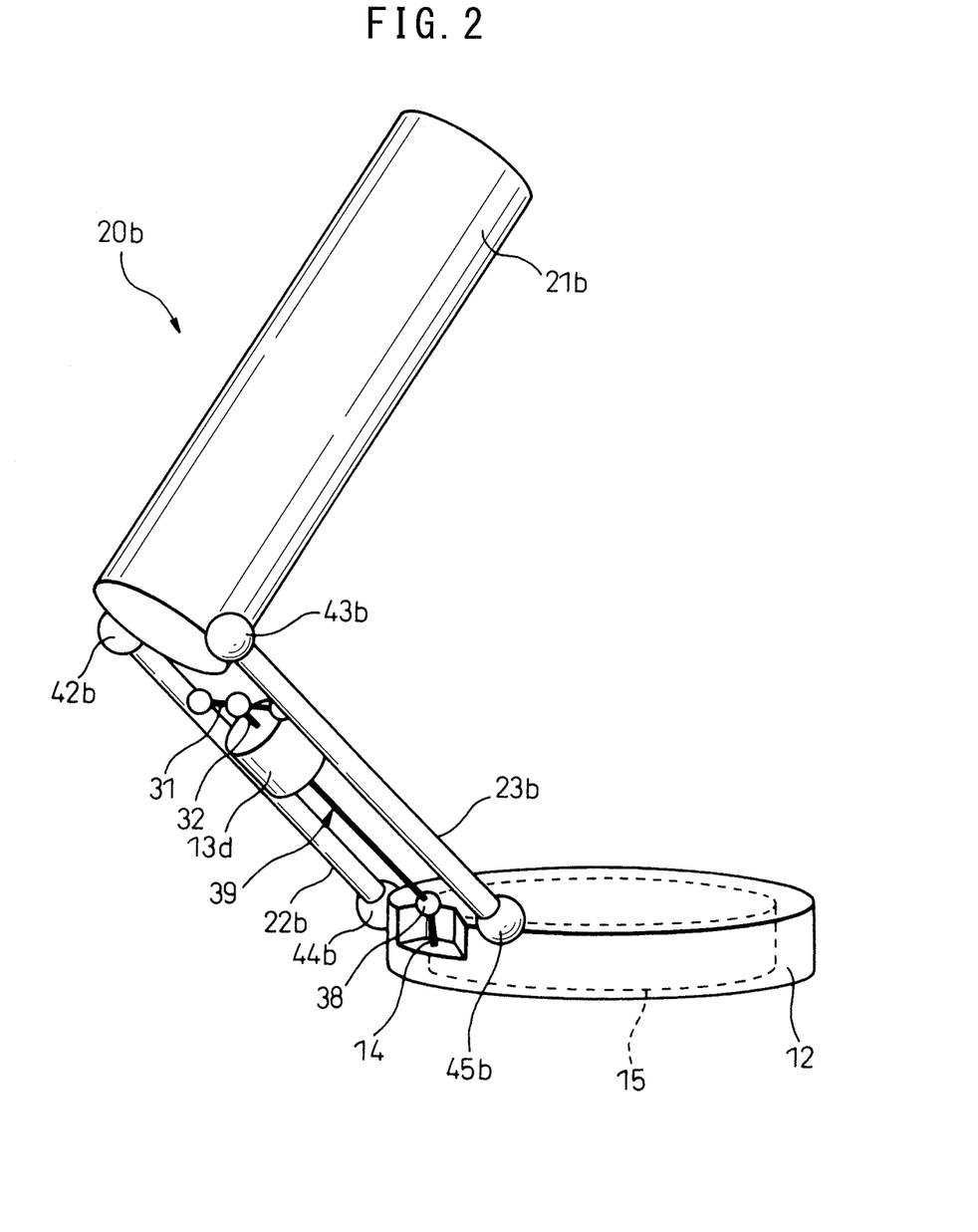
FIG. 2 is a partial perspective view of a parallel link robot which is shown in FIG. 1.

FIG. 2 is a partial perspective view of a parallel link robot which is shown in FIG. 1. As shown in FIG. 2, the link part 20b is comprised of a drive link 21b and two driven links 22b and 23b which extend from the moving part 12. These are linked with each other by spherical bearings 42b and 43b. Further, the front ends of the driven links 22b and 23b are linked by spherical bearings 44b and 45b to the moving part 12. These spherical bearings 42b to 45b are arranged so that the quadrilateral shape having these spherical bearings as vertexes becomes a parallelogram. In FIG. 1, the drive link 21b which extends from the base part 11 is connected to an actuator 13b which drives the drive link 21b. This actuator 13b is placed on the base part 11.

The other link parts 20a and 20c are configured in the same way as the link part 20b, so a detailed explanation will be omitted. Further, as can be seen from the figure, the parallel link robot 10 of the present invention a δ-type. Further, the actuators 13a to 13c of the link parts 20a to 20c may be separately controlled so as to position the mounting member 19 which is linked with the moving part 12 at a desired position relating to the first axis to third axis with three degrees of freedom.

Referring again to FIG. 2, the reinforcing link 31 links the two driven links 22b and 23b through bearings. Furthermore, an additional actuator 13d is attached to the shaft 32 from the center part of the reinforcing link 31 through bearings. As shown in the figure, an output shaft of the additional actuator 13d is directed toward the moving part 12.

As shown in FIG. 2, a power transmission shaft part 39 which extends from the output shaft of the additional actuator 13d extends between the two driven links 22b and 23b in parallel with these driven links 22b and 23b. Furthermore, the power transmission shaft part 39 is connected to a shaft part 14 which extends from the posture changing mechanism part 15 through a universal joint 38.

The posture changing mechanism part 15 performs the function of changing the posture of the mounting member 19. Due to this, the posture of the end effecter can be changed. Note that, posture changing mechanism part 15 is included in the moving part 12 at least partially. Alternatively, the posture changing mechanism part 15 as a whole may be arranged at a position between the moving part 12 and the mounting member 19.

Figure 3:
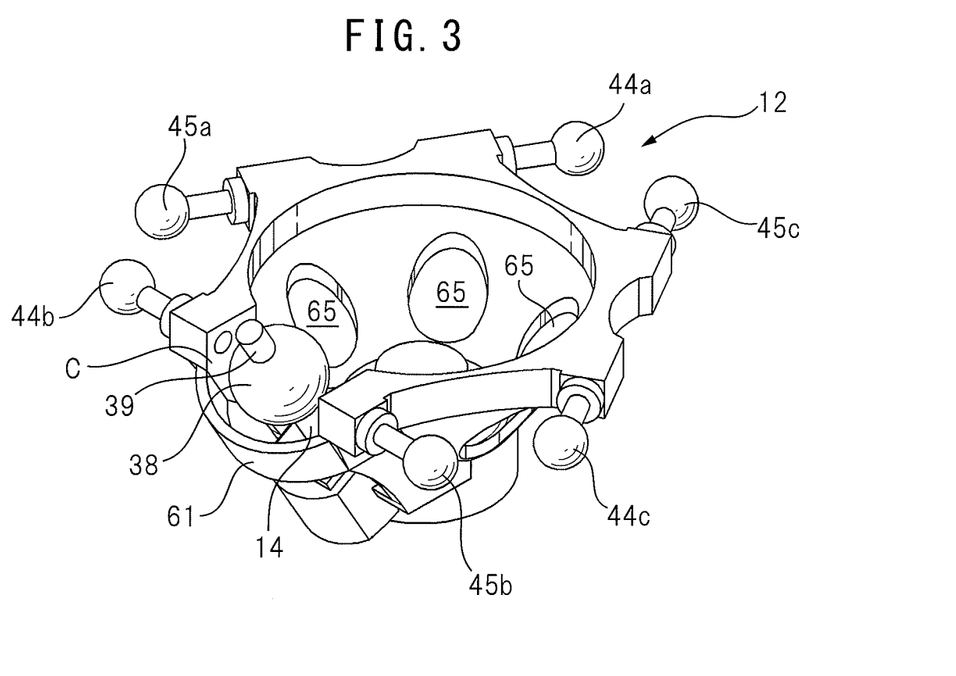
FIG. 3 is a perspective view of a casing of a moving part in an embodiment of the present invention.

FIG. 3 is a perspective view of a casing of a moving part in an embodiment of the present invention. In FIG. 3, the universal joint 38 is arranged on the line connecting the spherical bearings 44b and 45b. Further, to avoid this universal joint 38 from interfering with the casing of the moving part 12, a cutaway part C is formed at the edge of the moving part 12.

Further, in the present invention, a linking/reinforcing part 61 is provided which links together the two ends of the cutaway part C. As shown in the figure, the linking/reinforcing part 61 is a belt-shaped member which is bent so as to bypass the universal joint 38. The linking/reinforcing part 61 is preferably formed from the same material as the moving part 12. Note that, the shape of the linking/reinforcing part 61 is not limited to that illustrated. For example, the linking/reinforcing part 61 may be extended from the outer surface of the casing of the moving parts 12 which adjoin the two ends of the cutaway part C. Alternatively, the linking/reinforcing part 61 may be bent in a polygonal shape while bypassing the universal joint 38.

In this regard, in FIG. 1, a single additional actuator 13d and related members are provided between the pair of driven links 22b and 23b. In another embodiment of the present invention, additional actuators 13d and related members may be additionally provided between the other pair of driven links 22a and 23a and between the driven links 22c and 23c. In such a case, compared with the case which is shown in FIG. 1, the degrees of freedom of the mounting member 19 can be raised further by two.

Figure 4:
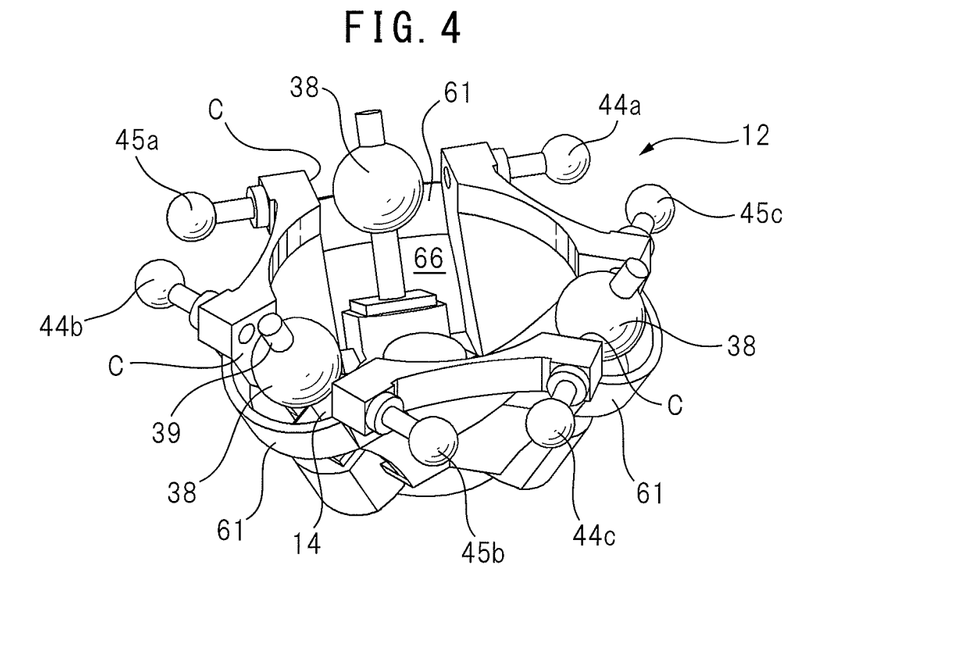
FIG. 4 is a perspective view of a casing of a moving part in another embodiment of the present invention.

FIG. 4 is a perspective view of the casing of the moving part in another embodiment of the present invention. In FIG. 4, cutaway parts C are also formed between the spherical bearings 44a and 45a related to the driven links 22a and 23a and between the spherical bearings 44c and 45c relating to the driven links 22c and 23c. Further, at these cutaway parts C, related universal joints 38 are arranged. Furthermore, these cutaway parts C are also provided with linking/reinforcing parts 61 similar to those explained before.

In the present invention, the linking/reinforcing parts 61 perform the function of reinforcing the cutaway parts C of the casing of the moving part 12. For this reason, the rigidity of the casing of the moving part 12 becomes higher. Therefore, in the present invention, even if the moving part 12 is made smaller in thickness, the necessary rigidity of the moving part 12 is held. As a result, the moving part 12 can be lightened and the parallel link robot 10 can be operated at a higher speed.

Furthermore, in FIG. 3, a plurality of through holes 65 are formed at the lower slanted surface of the casing of the moving part 12. These through holes 65 are formed at substantially equal intervals in the circumferential direction of the moving part 12. Further, in FIG. 4, the grooves 66 are formed at positions which correspond to the universal joints 38. Note that, the through holes 65 and grooves 66 are not limited in shapes to the ones illustrated.

In the present invention, since the linking/reinforcing parts 61 are provided, even if these through holes 65 and grooves 66 are formed, the rigidity required for the casing of the moving part 12 can be maintained. In other words, since the linking/reinforcing parts 61 are provided, the through holes 65 and grooves 66 can be formed in the casing of the moving part 12. Further, these through holes 65 and grooves 66 function to further lighten the weight of the casing of the moving part 12.

A parallel link robot 10 is sometimes cleaned periodically. Further, the fluid which is used when cleaning the parallel link robot 10 passes through the through holes 65 or grooves 66 and flows out to the outside of the moving part 12. Therefore, in the present invention, the cleaning fluid does not build up inside of the moving part 12 and there is no problem in sanitation. For this reason, the parallel link robot 10 of the present invention is particularly advantageous in the case of use in the fields of food, pharmaceuticals, cosmetics, etc.

Figure 5:
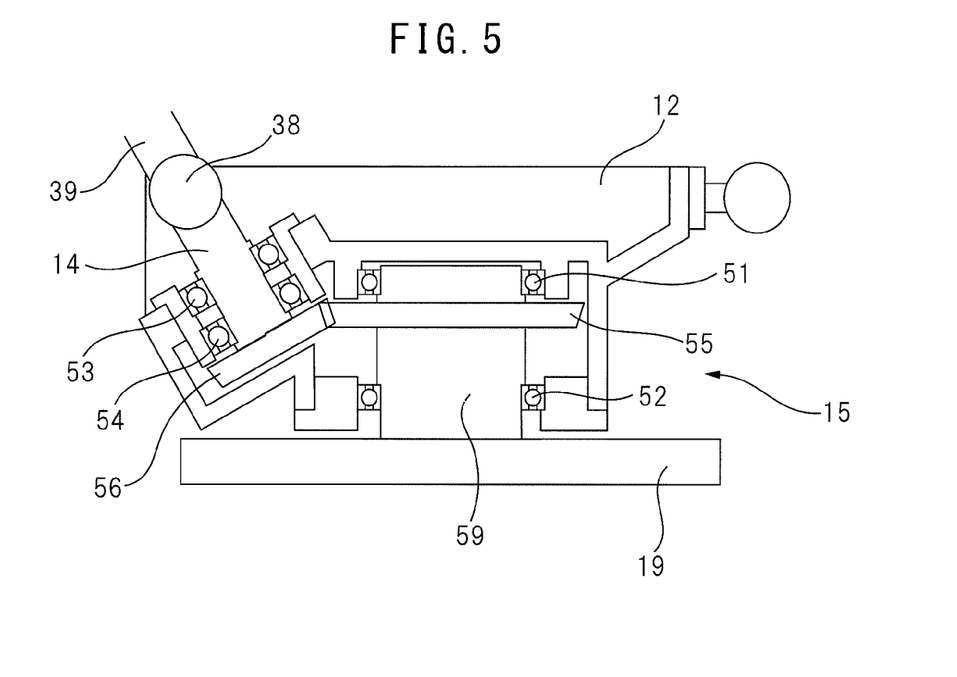
FIG. 5 is a cross-sectional view of a moving part according to the present invention.

FIG. 5 is a cross-sectional view of a moving part according to the present invention. In FIG. 5, the mounting member 19 which can rotate about the rotary shaft 59 is attached below the moving part 12. At the rotary shaft 59, the first bearing 51 and the second bearing 52 are arranged. At the front end of the rotary shaft 59, a bevel gear 55 is attached. As can be seen from FIG. 5, the bevel gear 55 of the rotary shaft 59 engages with a bevel gear 56 which is attached to the front end of the shaft part 14. Further, at the shaft part 14, a third bearing 53 and a fourth bearing 54 are arranged. These bevel gears 55 and 56 form the posture changing mechanism part 15.

As shown in FIG. 5, in the present invention, the first bearing 51 is arranged at one surface side of the bevel gear 55, while the second bearing 52 is arranged at the other surface side of the bevel gear 55. In other words, the first bearing 51 and the second bearing 52 straddle the bevel gear 55, while the second bearing 52 is arranged between the bevel gear 55 and the mounting member 19.

For this reason, the distance between the mounting member 19 which is attached to the moving part 12 and the second bearing 52 becomes shorter and the load which is applied to the first bearing 51 and the second bearing 52 becomes smaller. Further, the distance between the first bearing 51 and the second bearing 52 can be made longer by exactly the amount of the bevel gear 55, so the load which is applied to these bearings 51 and 52 can be further reduced. For this reason, the first bearing 51 and the second bearing 52 can be made smaller in size, and the moving part 12 can be further lightened in weight. As a result, it can be understood that the parallel link robot 10 can be made to operate at a further higher speed.

Figure 6:
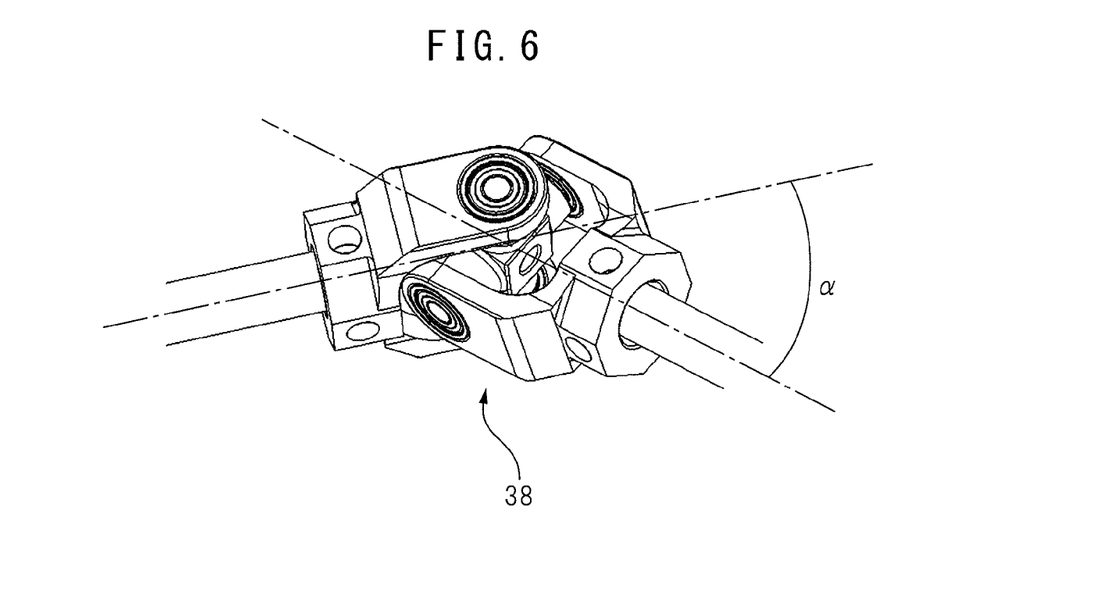
FIG. 6 is a partial enlarged view of a parallel link robot.

The universal joint 38 tracks movement of the driven links 22b and 23b and moving part 12. In this connection, the partial enlarged view of a parallel link robot of FIG. 6 shows the bent angle α of the universal joint 38. If the bent angle α becomes larger, the related parts interfere with each other. To prevent such interference, the parts have to be made larger.

On the contrary, the universal joint 38 is desirably made smaller in size and lighter in weight. To make the maximum bent angle of the universal joint 38 smaller, the bevel gear 56 of the shaft part 14 at the input side is slanted with respect to the rotary shaft 59 by exactly an angle of about 30°.

Figure 7:
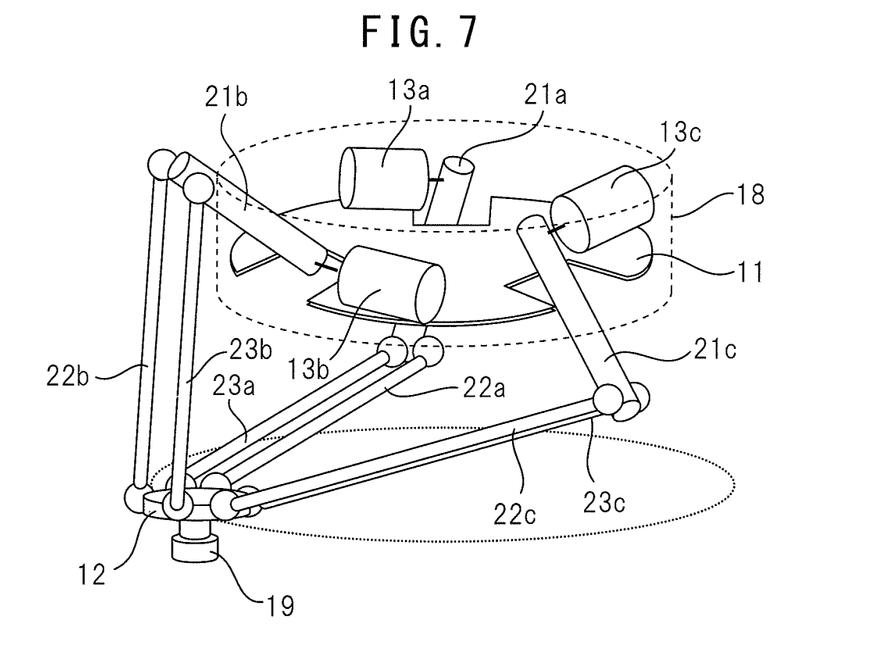
FIG. 7 is a perspective view of a parallel link robot when the bent angle becomes maximum in a certain direction.
Figure 8:
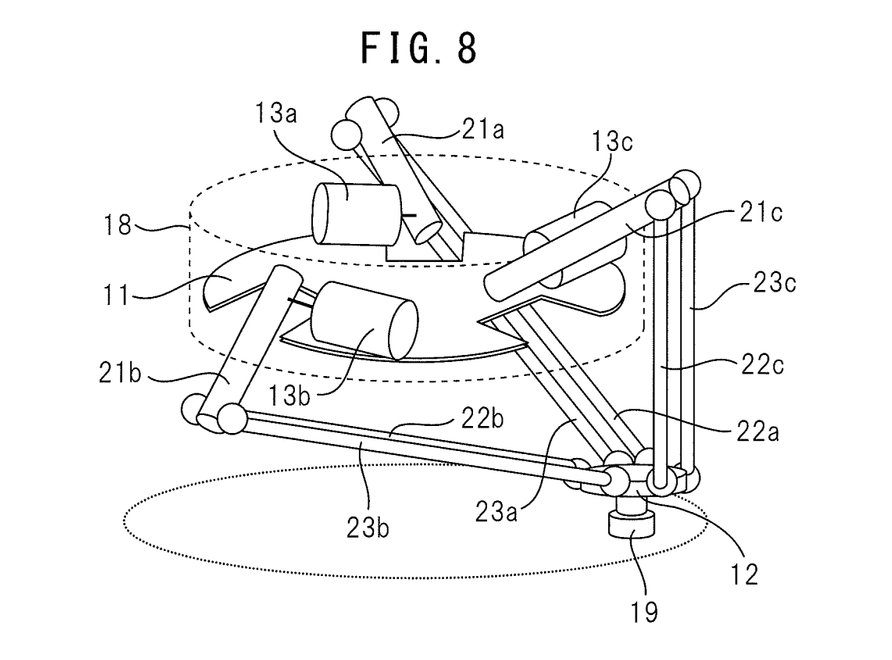
FIG. 8 is a perspective view of a parallel link robot when the bent angle becomes maximum in a direction opposite to the certain direction.

FIG. 7 is a perspective view of a parallel link robot when the bent angle becomes maximum in a certain direction. The state which is shown in FIG. 7 is defined as the "state A". Further, FIG. 8 is a perspective view of a parallel link robot when the bent angle becomes maximum in a direction opposite to the certain direction. The state which is shown in FIG. 8 is defined as the "state B". Note that, the ovals which are shown at the bottoms of FIG. 7 and FIG. 8 show the range of operation of the moving part 12.

Figure 9:
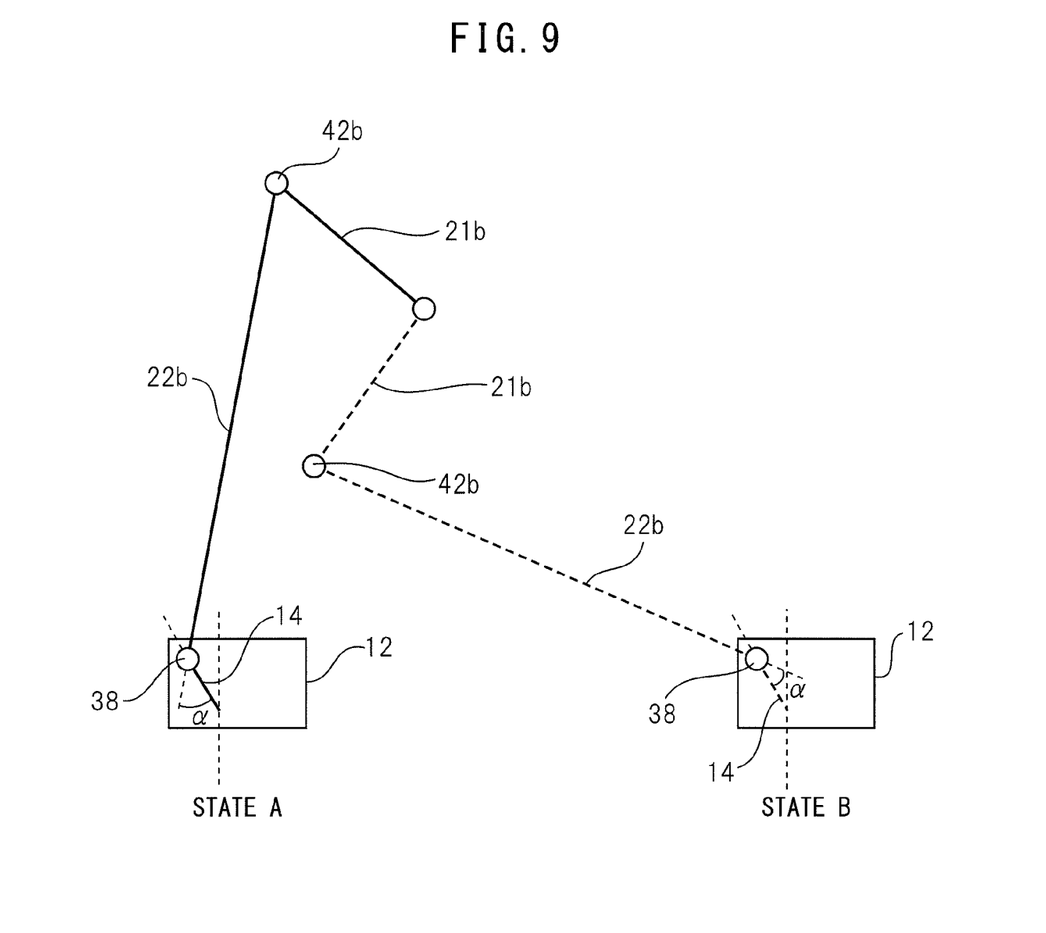
FIG. 9 is a view which shows a bent angle of a universal joint in a state A and a state B.

Furthermore, FIG. 9 is a view which shows the bent angle of the universal joint in the state A and the state B. In FIG. 9, the drive link 21b and driven link 22b are shown as representative examples. The solid line which is shown in FIG. 9 corresponds generally to the state A of FIG. 7, while the broken line which is shown in FIG. 9 corresponds generally to the state B of FIG. 8.

In FIG. 7 to FIG. 9, if slanted so that the bent angles α of the state A and the state B become equal, the maximum bent angle becomes smaller. Therefore, in the present invention, the bent angle α is set to 30°. Note that, only naturally, the bent angle α can be set to another value other than 30°.

Effects of Invention

In the first aspect, the linking/reinforcing parts are provided, so the rigidity of the moving part can be raised. Therefore, the moving part can be made smaller in thickness and the moving part can be lightened in weight. For this reason, the parallel link robot can be operated at a faster speed.

In the second aspect, the first bearing and the second bearing straddle the first bevel gear. For this reason, the distance between the element attached to the moving part (mounting member) and one of the bearings (second bearing) becomes smaller and the load which is applied to the first bearing and second bearing becomes smaller. Further, the distance between the first bearing and the second bearing can be lengthened by exactly the amount of the first bevel gear, so the load which is applied to these bearings can be made further smaller. For this reason, the first bearing and the second bearing can be reduced in size which leads to a lighter weight of the moving part.

In a third aspect, the fluid which is used when cleaning the parallel link robot flows out through the grooves or through holes to outside of the moving part. Therefore, the cleaning fluid does not build up at the inside of the moving part and no problem arises in sanitariness.

Typical embodiments were used to explain the present invention, but it will be understood that a person skilled in the art could make the above-mentioned changes and various other changes, deletions, and additions without departing from the scope of the present invention.

The invention claimed is:

1. A parallel link robot, comprising:
   a base part,
   a moving part,
   three link parts which link said base part and said moving part and respectively have single degrees of freedom with respect to said base part,
   three actuators which drive said link parts, respectively, each of said link parts including a drive link which is linked with said base part and two parallel driven links which link said drive link and said moving part,
   a posture changing mechanism part which changes a posture of an element which is attached to said moving part,
   an additional actuator which is arranged between said two drive links of at least one said link part in parallel to these driven links,
   a power transmission shaft part which extends coaxially from said additional actuator and transmits the rotational drive force of said additional actuator to said posture changing mechanism part, and
   a universal joint which connects a shaft part which extends from said posture changing mechanism part and said power transmission shaft part, said universal joint being arranged in a cutaway part which is formed in a casing of said moving part and being positioned on a line connecting two intersecting points between said two driven links and said moving part,
   wherein said parallel link robot comprises a linking/reinforcing part which bypasses said universal joint and links and reinforces the two ends of the cutaway part of the casing of said moving part, and
   wherein the linking/reinforcing part extends outward from an outer surface of the casing of the moving part so as to bypass the universal joint.

2. The parallel link robot as set forth in claim 1, wherein said posture changing mechanism part includes a first bevel gear which is attached to a rotary shaft which turns an element which is attached to said moving part and a second bevel gear which is attached to said shaft part and engages with said first bevel gear,
   wherein a first bearing is arranged at said rotary shaft at one side of said first bevel gear, and a second bearing is arranged at said rotary shaft at the other side of said first bevel gear.

3. The parallel link robot as set forth in claim 1, wherein said moving part is formed with at least one groove or through hole at its casing.

4. The parallel link robot as set forth in claim 1, wherein the linking/reinforcing part is a belt-shaped member or a polygonal-shaped member.

5. The parallel link robot as set forth in claim 1, wherein the linking/reinforcing part is formed from the same materials as the moving part.

* * * * *